Dec. 5, 1950     E. T. LORIG     2,532,562
CONTINUOUS STRAND HELICAL CONVEYING
AND HEATING APPARATUS
Filed Sept. 12, 1949     2 Sheets-Sheet 2
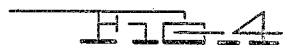
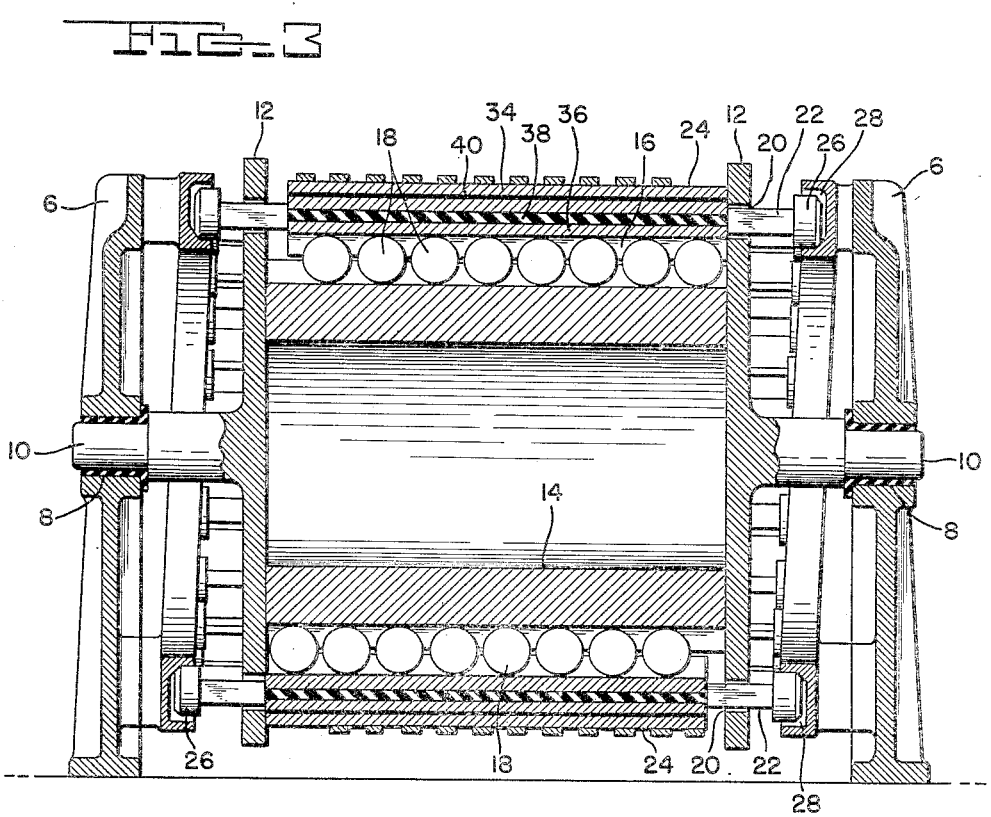
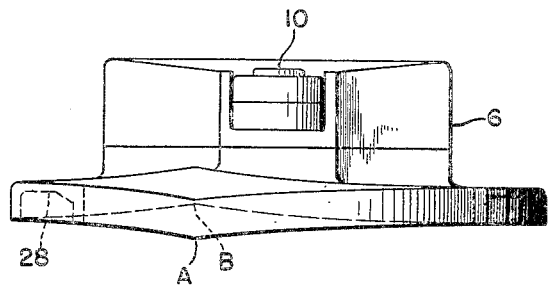
INVENTOR.
EDWIN T. LORIG
BY Donald G. Dalton
ATTORNEY Patented Dec. 5, 1950

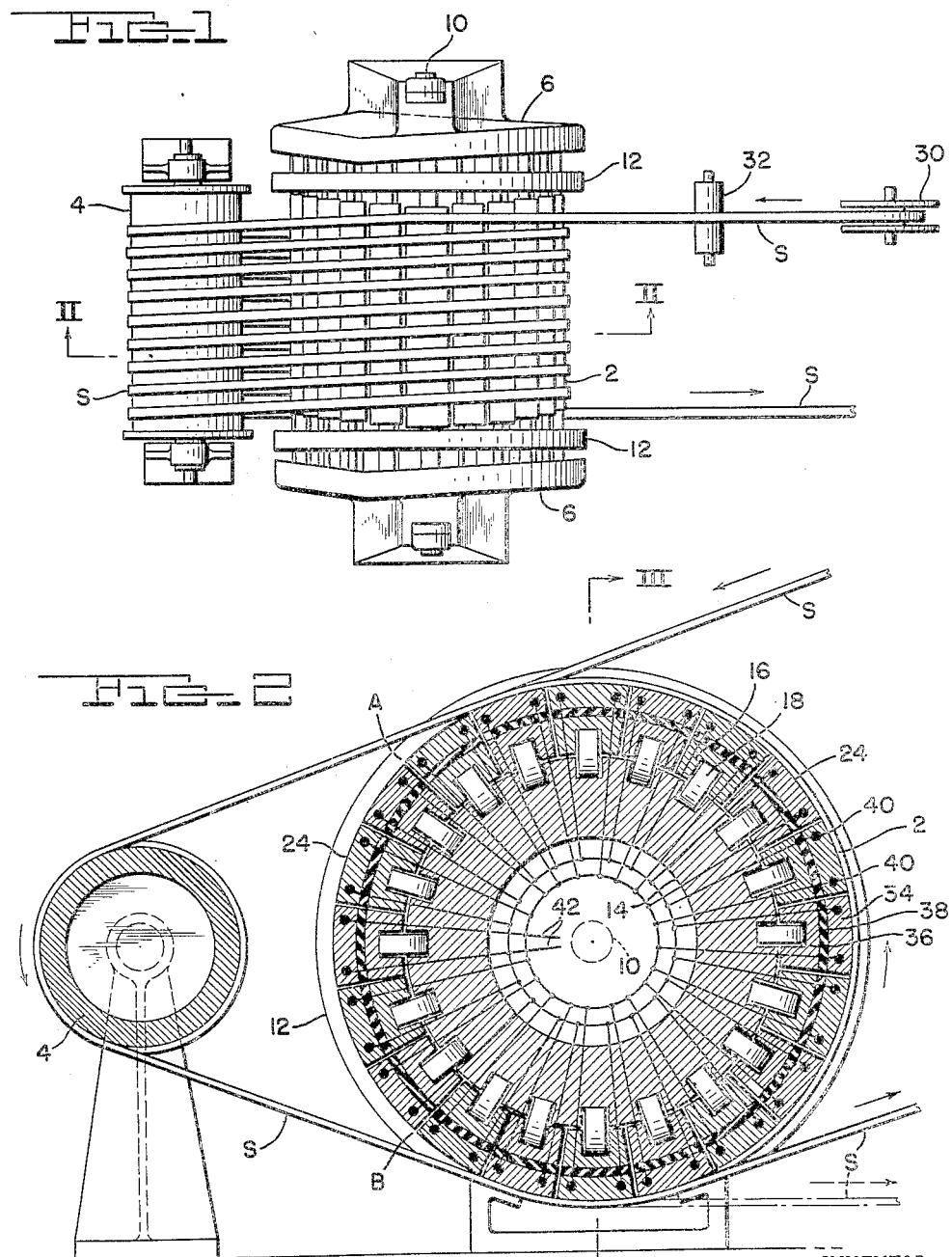

2,532,562

UNITED STATES PATENT OFFICE 2,532,562

CONTINUOUS STRAND HELICAL CONVEYING AND HEATING APPARATUS

Edwin T. Lorig, Ross Township, Allegheny County, Pa., assignor to Carnegie-Illinois Steel Corporation, a corporation of New Jersey Application September 12, 1949, Serial No. 115,141

3 Claims. (Cl. 219—19)

This invention relates to continuous strand helical conveying and heating apparatus and is a continuation-in-part of my copending application, Serial No. 85,699, filed April 5, 1949.

In the processing of flat strips in coil form, such as lacquering or enameling the strip, the equipment must be extremely long if the strip is to be rapidly processed. Ordinarily, the strip will be lacquered or enameled and the lacquer or enamel dried by heating it from the side on which the coating has been applied. In so doing, gas bubbles are sometimes formed under the coating which has already set and these gas bubbles will break through the outside layer of the coating, thus destroying its effectiveness.

It is therefore an object of my invention to provide helical conveying and heating apparatus which is suitable for quickly handling long lengths of strip.

Another object is to provide helical conveying apparatus which can be used for heating the uncoated side of a continuous strip.

These and other objects will be more apparent after referring to the following specification and attached drawings, in which:

Figure 1 is a top plan view of my device;

Figure 2 is an enlarged sectional view taken on the line II—II of Figure 1;

Figure 3 is a sectional view taken on the line III—III of Figure 2; and

Figure 4 is a top plan view showing the cam track.

Referring more particularly to the drawings, the reference numeral 2 indicates a rotatable reel. A rotatable roll 4 is spaced from the reel 2 and has its axis substantially parallel thereto. As best shown in Figure 3, the reel 2 has a housing 6 at each end thereof. Each housing is provided with a bearing 8 for receiving a shaft 10. Mounted on each of the shafts 10 for movement therewith is a circular side plate 12. Extending between the plates 12 is a reel body 14 which is provided with a plurality of spaced apart grooves 16 around its periphery extending the length thereof. Mounted in each of the grooves 16 is a plurality of rollers 18. Each of the plates 12 is provided with a plurality of holes 20 around its periphery for receiving the reduced end portion 22 of non-rotatable spline segments 24 which form the outer periphery of reel 2. Sufficient clearance is provided between the spline segments to enable them to slide axially with respect to one another. Each of the reduced end portions 22 is provided with a roller 26 which is received in a helical cam groove 28 in the housing 6. The cam grooves 28 in the right and left hand housings 6 are complementary and are shaped to move the segment 24 axially as the reel rotates. The cam grooves 28 can be mounted directly in the housing 6 or in a separate member secured to the housing 6 as shown. The end portions 22 are made separate from the main portion of the spline segments 24 to provide for assembly. Each of the cam grooves 28 is circular with the axis thereof coinciding with the axis of rotation of shafts 10. Between points A and B the cam groove is inclined from a transverse plane in a direction to cause the splines to move rapidly in one direction. Between points B and A the cam groove is inclined in the opposite direction so that the splines are returned gradually and uniformly to their original position. The strip S to be processed passes to the reel 2 from an uncoiler 30 over the roll 32. Spline segments 24 are made of two parts 34 and 36 with a layer of insulation 38 therebetween. Electric heating elements 40 are provided in the outer segments 34. Lead wires 42 lead from the heating elements 40 into the reel body 14.

The operation of the device is as follows:

The strip S to be processed is fed to the reel 2 from the uncoiler 30 over the roll 32, around a portion of the reel 2, then around the roll 4 and back to the reel 2. The strip then passes around the portion of the reel from points B to A as shown in Figure 2 and the end thereof is clamped loosely to the oncoming strip to form a complete circle. Sufficient back tension is applied to the entering strip to tighten up the circular band to provide friction between the band and the reel body. The reel is then rotated either manually or mechanically and the strip S is moved gradually across the width of the reel while it is in contact therewith. This is done by movement of the splines 24 which is caused by the rollers 26 riding in the cam groove 28. Between points A and B the strip S is not in contact with the splines and the splines are moved in the reverse direction. Since the spline segments between points B and A are moving laterally in unison the same amount per degree of rotation there is no lateral movement between the spline segments and therefore no movement of the strand relative to the spline surfaces. In other words, the cam track between points B and A is helically formed at its base with the angle between the base and a plane perpendicular to the axis of reel rotation being the same at all points. The strip S can be removed from the reel 2 at any point. As the strip passes to the reel 2, the outer surface may be coated with enamel or lacquer and the coating will be dried on the reel 2 by means of the heating elements 40 heating up the segments 24, which in turn, causes heat to flow through the strip to the enamel or lacquer coating. This causes the coating to dry from the inside adjacent the strip, thus eliminating any danger of gas bubbles forming in any part of the coating which is set. If desired, the opposite side of the strip S can be coated in the same manner.

While one embodiment of my invention has been shown and described, it will be apparent that other adaptations and modifications may be made without departing from the scope of the following claims.

I claim:

1. A continuous strand helical conveying and heating reel comprising a pair of spaced apart housings, a roll body extending between and rotatably mounted in said housings, a plurality of non-rotatable splines arranged around the periphery of said body, heating elements in said splines, each of said housings having a helically formed cam groove therein facing the opposite housing, the ends of said splines extending into said cam grooves, the bottom of said cam grooves over a portion of their periphery being arranged at an angle with a plane perpendicular to the axis of the reel to move the splines axially in one direction, and the remaining portion of said cam grooves having the bottom thereof arranged at an oppositely extending angle to move the splines axially an equal amount per degree of reel revolution in the opposite direction.

2. Continuous strand helical conveying and heating apparatus comprising a rotatable reel and a rotatable roll spaced therefrom with its axis substantially parallel to the axis of the reel, said rotatable reel having a housing at each end thereof, a roll body extending between and rotatably mounted in said housings, a plurality of non-rotatable splines arranged around the periphery of said body, heating elements in said splines, cam means for moving the splines axially in one direction during the time they are adjacent the roll, and cam means for moving the splines axially an equal amount per degree of reel revolution in the opposite direction during the rest of their travel.

3. A continuous strand helical conveying and heating reel comprising a pair of spaced apart housings, a roll body extending between and rotatably mounted in said housings, a plurality of non-rotatable splines arranged around the periphery of said body, heating elements in said splines, cam means for moving the splines axially in one direction during a portion of their travel, and cam means for moving the splines axially an equal amount per degree of reel revolution in the opposite direction during the rest of their travel.

EDWIN T. LORIG.

REFERENCES CITED

The following references are of record in the file of this patent:

UNITED STATES PATENTS

| Number | Name | Date |
| --- | --- | --- |
| 2,047,372 | Jalens | July 14, 1936 |